US009037475B2

(12) United States Patent
Tengler et al.

(10) Patent No.: US 9,037,475 B2
(45) Date of Patent: May 19, 2015

(54) SYSTEM AND METHOD FOR AUCTIONING GEOBOXED FLEXIBLE, SEMI-LOCKED OR LOCKED RADIO PRESETS

(75) Inventors: Steven C. Tengler, Grosse Pointe Park, MI (US); Mark S. Frye, Grosse Pointe Woods, MI (US)

(73) Assignee: General Motors LLC, Detroit, MI (US)

( * ) Notice: Subject to any disclaimer, the term of this patent is extended or adjusted under 35 U.S.C. 154(b) by 1046 days.

(21) Appl. No.: 12/962,103

(22) Filed: Dec. 7, 2010

(65) Prior Publication Data

US 2012/0143615 A1 Jun. 7, 2012

(51) Int. Cl.

*G06Q 10/00* (2012.01)
*G06Q 99/00* (2006.01)
*G06Q 30/08* (2012.01)

(52) U.S. Cl.

CPC ................ *G06Q 99/00* (2013.01); *G06Q 30/08* (2013.01)

(58) Field of Classification Search

USPC .................. 705/1, 300, 1.1, 14.63; 455/186.1
See application file for complete search history.

(56) References Cited

U.S. PATENT DOCUMENTS

2003/0018539 A1* 1/2003 La Poutre et al. ............... 705/26
2007/0293169 A1* 12/2007 Maggio ...................... 455/152.1
2009/0053991 A1* 2/2009 Mantel et al. ................ 455/3.04
2011/0207423 A1* 8/2011 Tarte .......................... 455/186.1

OTHER PUBLICATIONS

The Bakersfield Californian, “Competition rises in radio industry”, by David Drudge, Feb. 10, 2006, 5 pages.*

* cited by examiner

*Primary Examiner* — Kira Nguyen
(74) *Attorney, Agent, or Firm* — Leydig, Voit & Mayer, Ltd.

(57) ABSTRACT

The described system and method provides for the auctioning of radio presets in a vehicle and loading radio preset information into radio preset slots of the vehicle including different types of presets and different sets of preset information corresponding to different preset zones. Multiple auctions may be conducted for each vehicle or group of vehicles, and the auctions may be based on a variety of factors such as different types of presets, different preset zones, number of vehicles, type of vehicles, etc. Once the auction or auctions are won, radio preset slots corresponding to the results of the auctions may be loaded into vehicles at the manufacturer, dealership, or upon the occurrence of a geobox trigger when a vehicle is determined to be inside a particular preset zone.

6 Claims, 4 Drawing Sheets

SYSTEM AND METHOD FOR AUCTIONING GEOBOXED FLEXIBLE, SEMI-LOCKED OR LOCKED RADIO PRESETS

BACKGROUND OF THE INVENTION

Many vehicles, particularly motor vehicles such as cars and trucks, are equipped with radios. Drivers and occupants of the vehicles often listen to music, talk shows, news programs, and other radio programs while in their vehicles. As technology has progressed, new innovations in radio broadcasting have emerged as well, such as satellite radio and high definition radio, in addition to conventional AM (amplitude modulation) and FM (frequency modulation) radio broadcasting.

A common feature in conventional vehicles is the ability for an occupant of the vehicle to determine a number of radio presets. For example, the driver of the vehicle may have six FM radio stations and six AM radio stations that the driver prefers to listen to, and thus the driver may set each FM radio station and each AM radio station to one of six buttons (where each button corresponds to a preset slot) that, when pressed, allows the driver to jump to that radio station without having to tune the radio to the number corresponding to the desired station. In this example, the six preset slots may correspond to different sets of preset information depending on which mode the radio is set to, i.e., FM or AM.

Relatively newer vehicles may be equipped with telematics units, which provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

Thus, it is an object in part to provide a system and method for utilization of a telematics unit in connection with a vehicle's radio preset slotting feature, such that the subscriber experience is improved and new commercial opportunities are presented. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for auctioning and loading radio presets in a vehicle while including flexibility in designating different sets of preset information for different geobox regions. At least three different types of preset information are contemplated: default presets that are changeable by the driver, semi-locked presets that are changeable via a website, and fully-locked presets that are not changeable. A vehicle's or a group of vehicles' preset slots may be placed up for auction (including but not limited to through a commercial auction website such as EBAY.COM), and radio stations may bid on having their station address placed in the preset information corresponding to a preset slot that is up for auction. In a further implementation, the auction may specify a particular locality or preset zone, and one preset slot of a vehicle or group of vehicles may be placed up for multiple auctions corresponding to multiple preset zones. In yet another further implementation, when a vehicle travels from a first preset zone to another preset zone, a geobox trigger may be set off (e.g. the telematics unit of the vehicle detecting that the vehicle has entered a second geobox region, i.e., a second preset zone), and the vehicle may change the preset information corresponding to the preset slots of the vehicle to a set of preset information corresponding to the new preset zone that the vehicle entered. In yet another further implementation, the preset information corresponding to the new preset zone may be downloaded when the vehicle enters the new preset zone.

In yet another further implementation, a website may be provided where a driver or subscriber may change semi-locked preset information from corresponding to one radio station to another radio station via the website. A fee may be charged to the driver or subscriber in order to make the change. In yet another further implementation, the website may be implemented with security (including but not limited to a login name and password combination) such that only the driver or owner or subscriber may change the presets. In yet another further implementation, the driver or owner or subscriber may change semi-locked preset information to unlocked preset information and vice-versa through the website.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for auctioning and loading radio preset slot information in a vehicle including different types of preset information and different sets of preset information corresponding to different preset zones. At least three different types of presets are contemplated: default presets that are changeable by the driver, locked presets that are changeable via a website, and locked presets that are not changeable.

Figure 1:
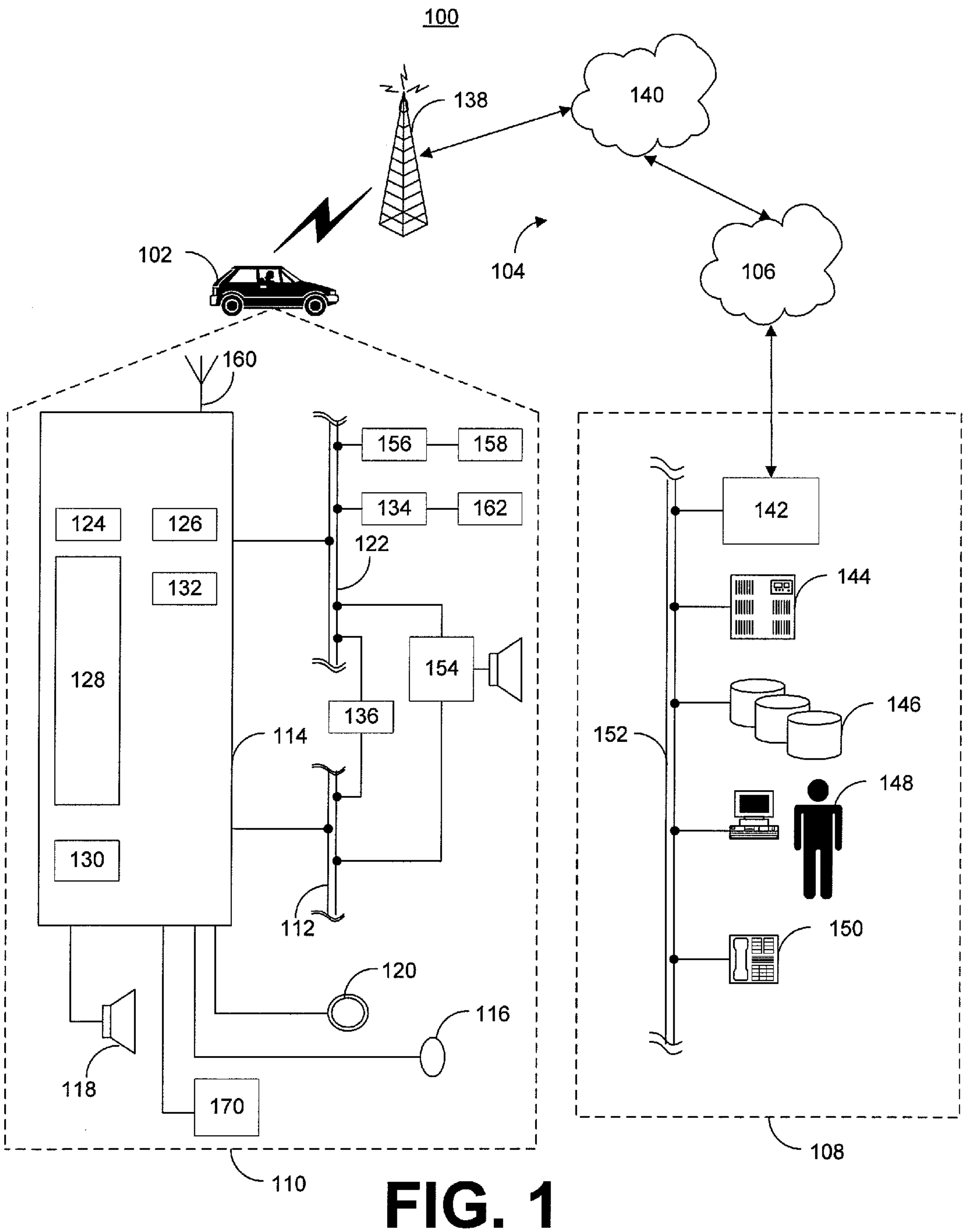
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118, buttons and/or controls 120 and a graphical display 170 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The graphical display 170 is connected to the telematics unit 114 and may be used to communicate a variety of information to the user of the telematics unit, including but not limited to turn-by-turn directions, GPS position, AM/FM radio information and presets, current CD or DVD information, telephone call status, etc. The graphical display 170 may further include a touch screen, and buttons may be implemented on the graphical display 170 to assist the user in navigating and operating the various telematics services. Buttons corresponding to radio preset slots may be implemented on the graphical display 170, or alternatively, may be implemented separate from the display as part of the buttons or controls 120 for utilizing vehicle hardware.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above, the telematics unit 114 and associated components are associated in an implementation of the invention with a vehicle 102. It will be appreciated, however, that the illustrated architecture is merely an example, and that the disclosed principles do not require that the vehicle be configured precisely as shown.

Figure 2:
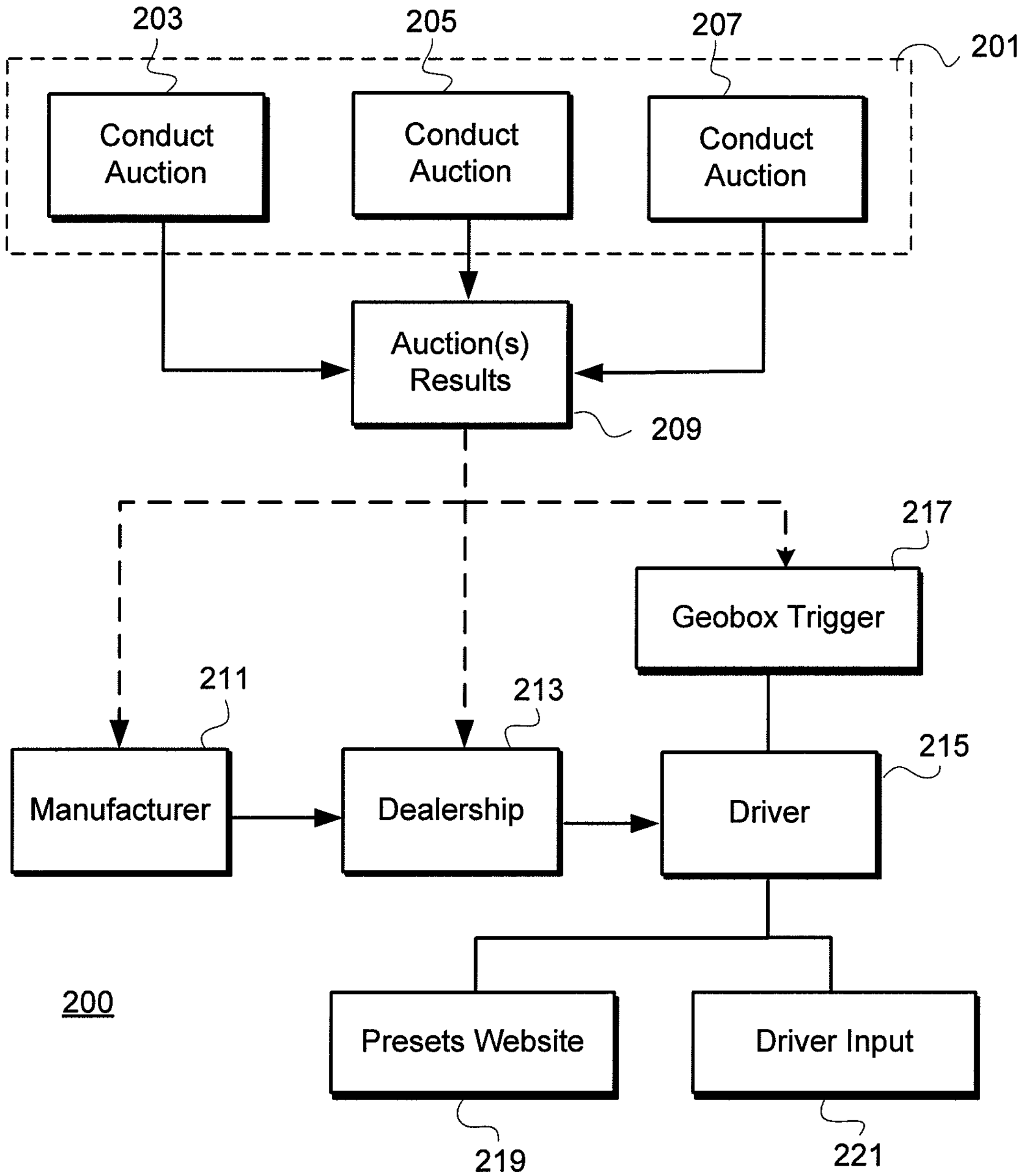
FIG. 2 is a flowchart illustrating a process for auctioning preset slots and implementing the auction results in one implementation.

With further reference to the architecture of FIG. 1, and turning more specifically to FIG. 2, a process 200 for implementing and changing auctioned preset slots of the vehicle's radio in one implementation is shown. In one implementation, an auction is conducted 201 by a telematics service provider, a vehicle dealership, a vehicle manufacturer, or other entity. The product being auctioned may be the loading of a preset slot of a vehicle with preset slot information of the winner of the auction's choice, i.e., the address of the winning radio station (e.g. FM 101.1 or AM 760 or XM 152, etc), such that pressing the button corresponding to that preset slot results in the vehicle playing back the content broadcasted by that radio station. In a further implementation, an identifier (e.g. a name or address such as "Top Tracks," "Boneyard," "XM 152," etc.) may be displayed to the user through a graphical display in the vehicle. In yet another further implementation, different types of presets may be auctioned, including but not limited to: unlocked presets that are changeable by the driver, semi-locked presets that are changeable via a website, and fully-locked presets that are not readily changeable by the driver.

One skilled in the art will appreciate that the product being auctioned off may be configured in any number of ways based on numerous variables and combinations of variables, including but not limited to: which preset slot is being auctioned, the type of preset being auctioned, a particular number of vehicles, a type of vehicle, where the vehicle is sold, where the vehicle is manufactured, the locality of the buyer, a geobox region (i.e. preset zone), etc. For example, possible auctions could include (but are not limited to): semi-locked preset for preset slot 1 in the next 1000 vehicles sold by ABC Dealership; unlocked preset for preset slot 2 of the next 10,000 Ford Mustangs manufactured at Plant XYZ; fully-locked preset for preset slot 4 of preset zone 1 corresponding to the Detroit area; and semi-locked preset for preset slot 3 of preset zone 2 for the next 1,000 Fords sold in the Detroit area. One skilled in the art will also appreciate that the auction may be conducted via multiple methods, including but not limited to a website or a live auction. Commercial auction websites such as EBAY.COM may be utilized.

In yet another further implementation, multiple auctions may be conducted for one vehicle or group of vehicles 201. These multiple auctions may correspond to multiple preset slots and multiple preset zones, such as separate auctions for all of a vehicle's various preset slots corresponding to one preset zone. For example, in one implementation, auctions 203, 205, and 207 of FIG. 2 may correspond to auctions for the presets of preset slots 1, 2 and 3, for the next 100 Ford vehicles sold at a particular dealership. It will be appreciated that only three auctions 203, 205, and 207 are shown for simplicity, and that the present invention is not limited to that number. For example, a separate auction may be held for the presets of preset slots 1 through 6 for the next 1,000 Ford vehicles sold at a particular dealership corresponding to one particular preset zone, and further auctions for the presets of preset slots 1 through 6 corresponding to other preset zones can be held for the same 1,000 Ford vehicles. It is thus contemplated that an unlimited number of auctions may be conducted corresponding to the radio preset slots of one vehicle or group of vehicles.

After results of the auctions have been determined 209, the radio preset slots of the vehicle or group of vehicles may be loaded with preset information corresponding to the results of the auctions. In one implementation, radio preset information corresponding to the auction results is loaded into a vehicle's preset slots at the manufacturing plant where the vehicle is manufactured 211. In another implementation, radio preset information corresponding to the auction results is loaded into a vehicle's preset slots at the dealership where the vehicle is to be sold 213.

In yet another implementation, the radio preset information is loaded into a vehicle's preset slots upon the occurrence of a geobox trigger (e.g. the vehicle is detected to be in a preset zone where preset slots corresponding to that preset zone have been auctioned off). The vehicle may already have been sold upon the occurrence of the geobox trigger and may be in the possession of a driver 215. In other further implementations, certain radio preset slot information may be loaded into a vehicle at the manufacturer or the dealership, and new preset information may be further loaded or updated upon occurrence of a geobox trigger. It will be appreciated that the radio preset slot information may be loaded into the vehicle via multiple methods, including but not limited to downloading them through the telematics unit 114, manually programming them in at the manufacturer or dealership, or hard-coding them into vehicle hardware associated with the preset slots.

In a further implementation, unlocked preset information may be changed by driver input 221. The driver may simply press buttons according to a predefined process (e.g. pressing and holding a preset slot button) on the graphical display 170 connected to the telematics unit 114 or other vehicle hardware associated with the preset slots (i.e. buttons and/or controls 120) to change the radio station address associated with a particular preset slot. In yet another further implementation, semi-locked presets may be changed by accessing a website designed to allow drivers or owners of the vehicle change the preset slot settings of their vehicles 219, and, further, a fee may be charged in order to change the preset information of the preset slot. In yet another further implementation, the website may be implemented with security (including but not limited to a login name and password combination) such that access to the website may be limited to authorized users (e.g. those that know the login name and password combination in one implementation). In yet another further implementation, unlocked presets may be changed to semi-locked presets by a driver or owner of the vehicle via a website, or semi-locked presets may be changed by a driver or owner to unlocked presets via the website.

Figure 3:
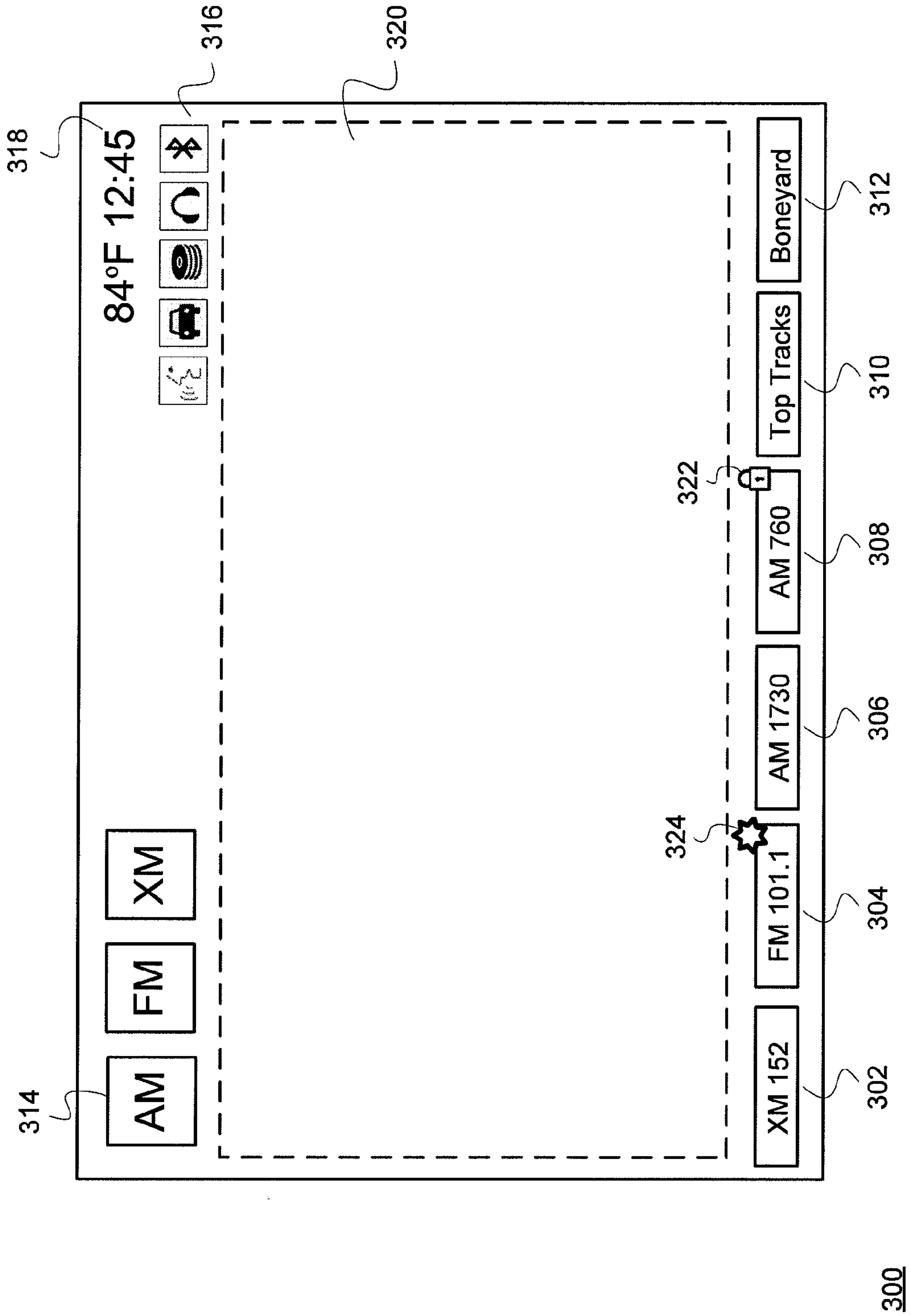
FIG. 3 is an example of a telematics unit display illustrating a user interface including radio presets in one implementation.

With further reference to the architecture of FIG. 1 and the process of FIG. 2, and turning more specifically to FIG. 3, an example of a telematics unit display 170 illustrating a user interface including radio presets in one implementation is shown 300. The radio preset slot buttons (302-312) are shown at the bottom of the display, while various other parts of the display are organized as shown (radio control buttons 314, time and temperature display 318, other control buttons 316, main display 320). It will be appreciated by one skilled in the art that FIG. 3 is merely an example of how the radio preset slot buttons may be set up in the context of a graphical display 170, and the invention is not limited to such a configuration.

In this example, auctions may have been conducted 201 for preset slots 1, 2, 3, 4, 5 and 6 of a vehicle and the results may have been loaded into the vehicle. Thus, a driver of the vehicle may press button 302 for preset slot 1, and the vehicle may play back the broadcast from radio station XM 152. Similarly, the driver may press button 312 for preset slot 6, and the vehicle may play back the broadcast from the radio station address associated with the radio station named "Boneyard." Further, the type of preset may be indicated on the display. In this example, preset slot 4, corresponding to button 308, contains semi-locked preset information which is changeable via website 217, as is indicated by the padlock icon 322. Preset slot 2, corresponding to button 304, contains fully-locked preset information, as is indicated by the star icon 324. Preset slots 1, 3, 5 and 6, corresponding to buttons 302, 306, 310 and 312, respectively, contain unlocked preset information and may be changeable by driver input 221. It will be appreciated by one skilled in the art that the particular icons and layout used are merely illustrative and the present invention is not limited to particular graphic depictions.

In a further implementation, a driver or owner of the vehicle may access a website and change unlocked preset information to semi-locked preset information and vice-versa. The display 300 may be updated accordingly to reflect such changes. In yet another further implementation, the set of preset information in the preset slots depicted in FIG. 3 corresponds only to one particular preset zone. When the vehicle enters a different preset zone, a geobox trigger may be set off 217, and a new set of preset information may be loaded to the preset slots of the display 300. In one implementation the sets of preset information corresponding to each preset zone may already be stored in memory on the vehicle's telematics unit 114 or other vehicle hardware. In another implementation, the vehicle's telematics unit 114 may download a new set of preset information when a geobox trigger is set off by entering a new preset zone.

Figure 4:
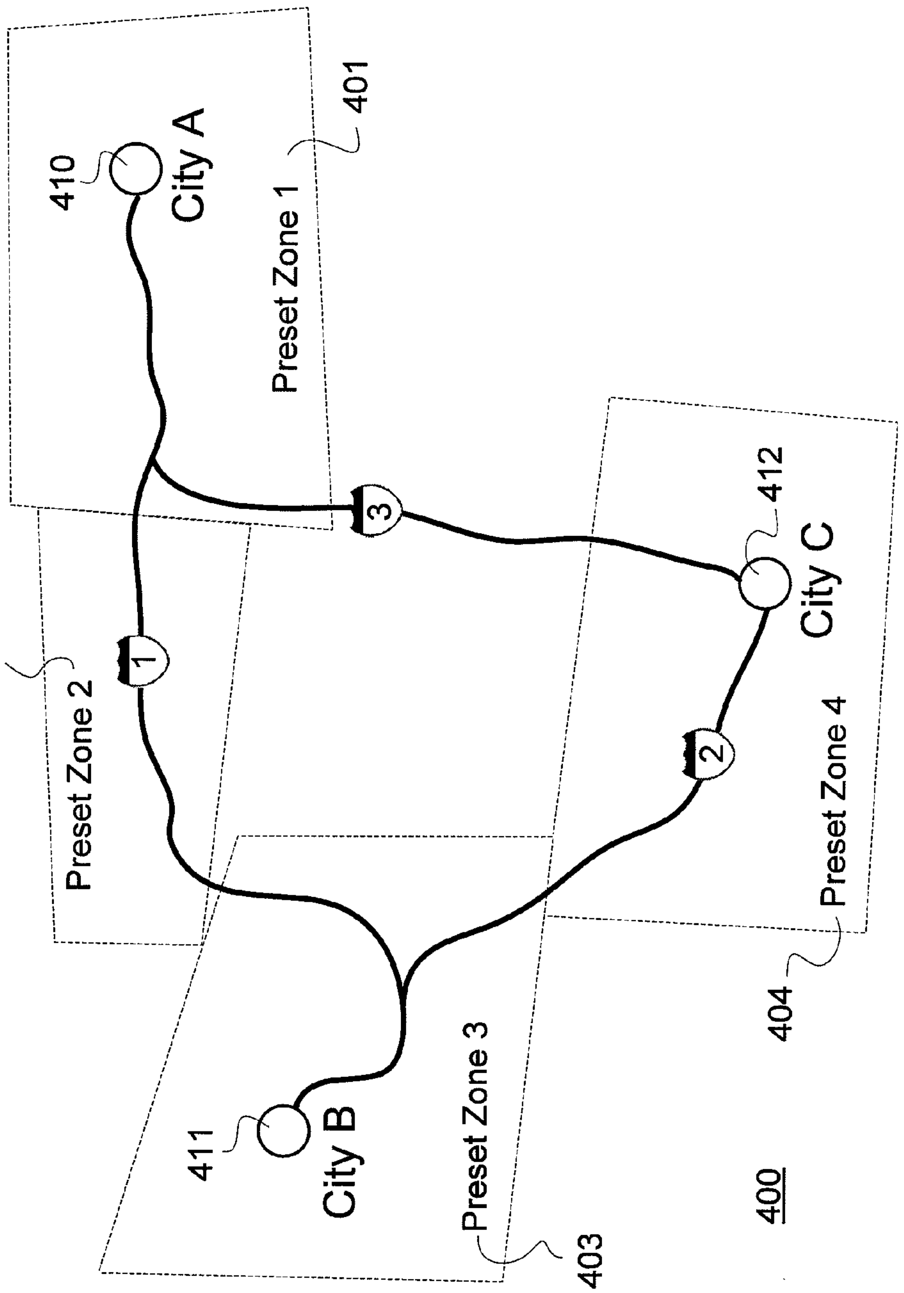
FIG. 4 is a simple example of a map illustrating the division of preset zones in one implementation.

With further reference to the architecture of FIG. 1 and the process of FIG. 2, and turning more specifically to FIG. 4, a simplified example of a map illustrating the division of preset zones in one implementation is shown. In one example, the preset slots of a vehicle sold at a dealership in City A 410 may be loaded with a set of radio preset information corresponding to Preset Zone 1 (401). As the vehicle drives from City A 410 to City B 411 along Highway 1, the vehicle crosses from the region of Preset Zone 1 (401) to the region of Preset Zone 2 (402). The telematics unit 114 may detect that the vehicle has entered Preset Zone 2 (402), and thus sets off a geobox trigger 217. A new set of radio preset information corresponding to Preset Zone 2 (402) may then be downloaded by the telematics unit 114 from a remote location (such as a telematics service provider call center 108) and loaded into the preset slots of the vehicle.

Alternatively, if the preset information corresponding to Preset Zone 2 (402) is already stored within the telematics unit's 114 memory, the telematics unit may simply load the new set of preset information from its memory. Similarly, a new set of preset information corresponding to Preset Zone 3 (403) is loaded when the vehicle crosses into Preset Zone 3 (403) from Preset Zone 2 (402). It will be appreciated by one skilled in the art that the preset zones depicted in FIG. 4 may be arbitrarily distributed as desired, and are not limited to the arrangement shown.

It will be appreciated that the described system and method allows for auctioning and loading of radio presets in a vehicle including different types of preset information and different sets of preset slots corresponding to different preset zones. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for configuring radio preset slots for vehicles, the method comprising:

auctioning, by a server, a radio preset slot corresponding to a plurality of vehicles with respect to a specified geographic area via an auction website, wherein the auctioning includes receiving bids for the radio preset slot and determining a winning radio station corresponding to the radio preset slot for the specified geographic area;

obtaining, by a telematics unit of a vehicle of the plurality of vehicles, radio preset information corresponding to the winning radio station, wherein the radio preset information includes an identifier associated with the winning radio station and preset type information;

determining, by the telematics unit, that the vehicle has entered the specified geographic area; and configuring, by the telematics unit, in response to the determining, the corresponding radio preset slot of the vehicle with the radio preset information such that user selection of the corresponding radio preset slot causes a radio of the vehicle to be tuned to the winning radio station, wherein the configuring further includes setting the corresponding radio preset slot to be one of a plurality of preset types according to the preset type information.

2. The method of claim 1, wherein the plurality of preset types include:

an unlocked preset type allowing a telematics subscriber to change radio preset information of the corresponding radio preset slot within the vehicle;

a semi-locked preset type requiring the telematics subscriber to change radio preset information of the corresponding radio preset slot through a website; and a fully-locked preset type prohibiting the telematics subscriber from changing radio preset information of the corresponding radio preset slot.

3. A system for configuring radio preset slots for vehicles, the system comprising:

a networked server, configured to auction a radio preset slot corresponding to a plurality of vehicles with respect to a specified geographic area via an auction website by receiving bids for the radio preset slot and determining a winning radio station corresponding to the radio preset slot for the specified geographic area;

a plurality of telematics-equipped vehicles, each including a telematics unit configured to:

obtain radio preset information corresponding to the winning radio station, wherein the radio preset information includes an identifier associated with the winning radio station and preset type information;

determine that the vehicle has entered the specified geographic area; and configure, in response to the determination that the vehicle has entered the specified geographic area, the corresponding radio preset slot of the vehicle with the radio preset information such that user selection of the corresponding radio preset slot causes a radio of the vehicle to be tuned to the winning radio station, wherein the configuring further includes setting the corresponding radio preset slot to be one of a plurality of preset types according to the preset type information.

4. The system according to claim 3, wherein the plurality of preset types include:

an unlocked preset type allowing a telematics subscriber to change radio preset information of the corresponding radio preset slot within the vehicle;

a semi-locked preset type requiring the telematics subscriber to change radio preset information of the corresponding radio preset slot through a website; and a fully-locked preset type prohibiting the telematics subscriber from changing radio preset information of the corresponding radio preset slot.

5. A method for configuring radio preset slots for vehicles, the method comprising:

auctioning, by a server, a radio preset slot corresponding to a plurality of vehicles with respect to a specified geographic area via an auction website, wherein the auctioning includes receiving bids for the radio preset slot and determining a winning radio station corresponding to the radio preset slot for the specified geographic area;

obtaining, by a telematics unit of a vehicle of the plurality of vehicles, radio preset information corresponding to the winning radio station, wherein the radio preset information includes an identifier associated with the winning radio station and preset type information; and configuring, by the telematics unit, the corresponding radio preset slot of the vehicle with the radio preset information such that user selection of the corresponding radio preset slot causes a radio of the vehicle to be tuned to the winning radio station, wherein the configuring further includes setting the corresponding radio preset slot to be one of a plurality of preset types according to the preset type information.

6. The system according to claim 5, wherein the plurality of preset types include:

an unlocked preset type allowing a telematics subscriber to change radio preset information of the corresponding radio preset slot within the vehicle;

a semi-locked preset type requiring the telematics subscriber to change radio preset information of the corresponding radio preset slot through a website; and a fully-locked preset type prohibiting the telematics subscriber from changing radio preset information of the corresponding radio preset slot.

* * * * *